April 7, 1925.
J. W. MEADOWCROFT
ELECTRIC WELDING JIG
Filed Sept. 6, 1922
1,532,833
2 Sheets-Sheet 1
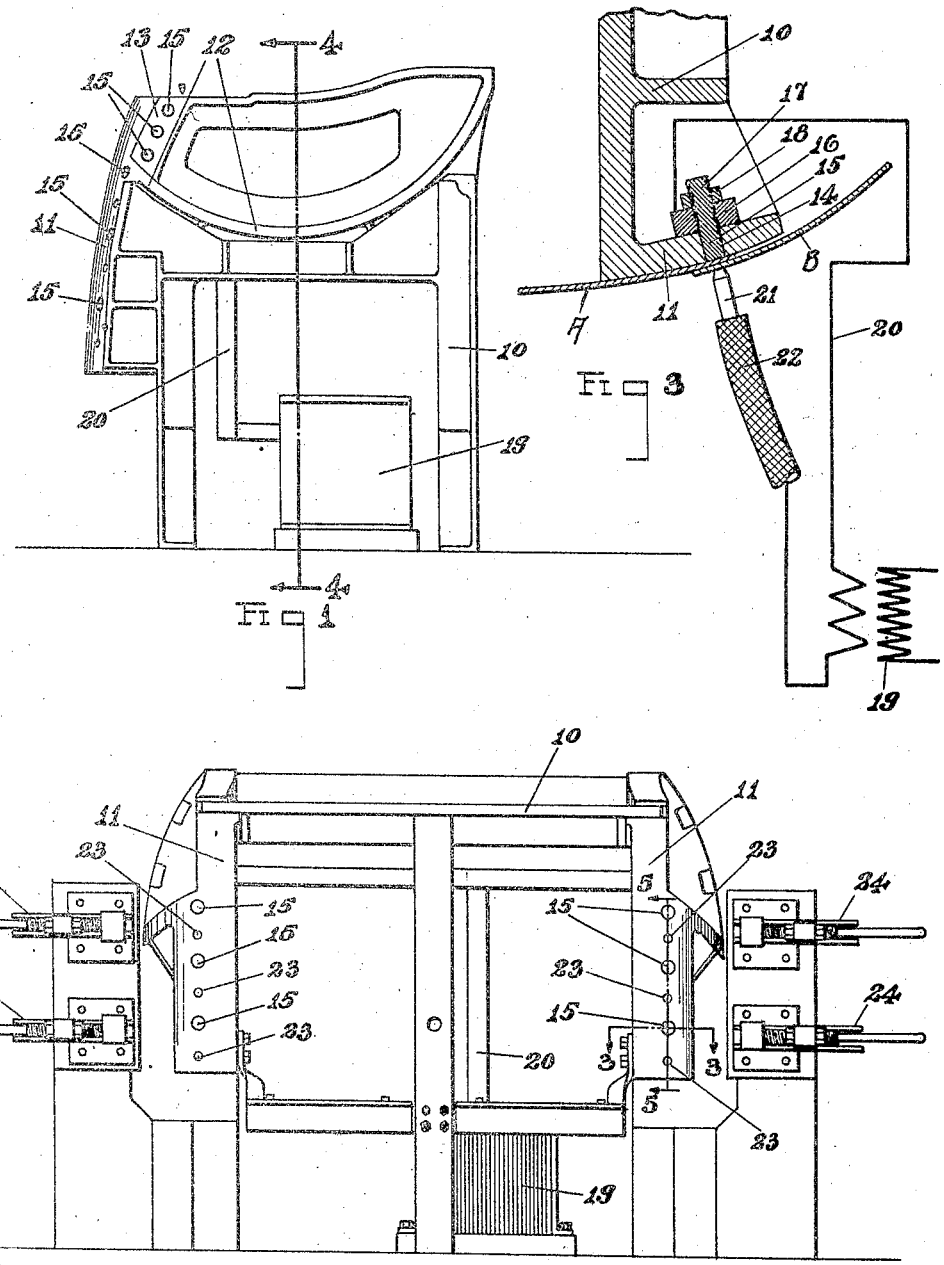
WITNESS:-
Walter M. Trout.
INVENTOR.
JOSEPH W. MEADOWCROFT.
BY
C. B. Desjardins
ATTORNEY

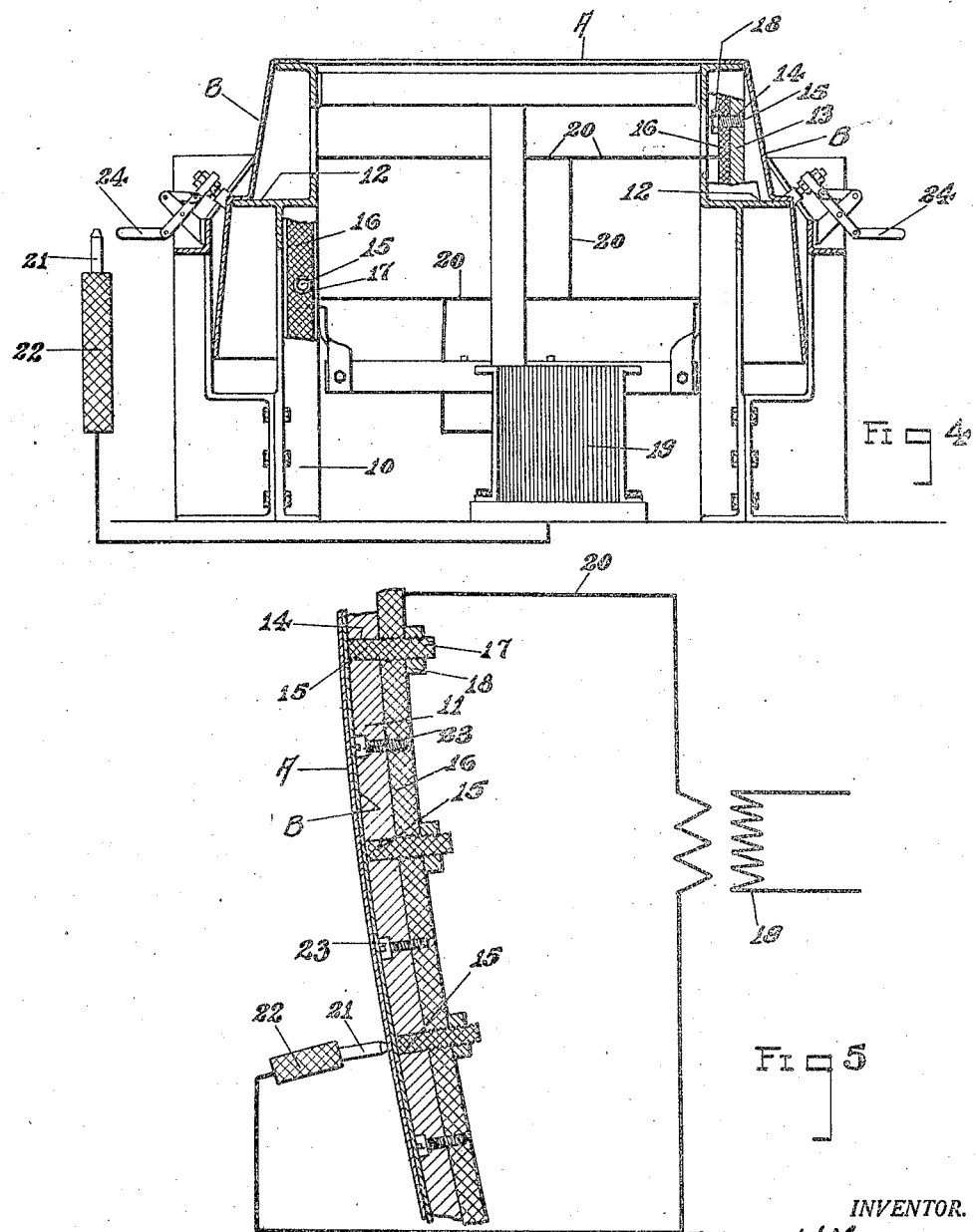

Patented Apr. 7, 1925.

1,532,833

UNITED STATES PATENT OFFICE.

JOSEPH W. MEADOWCROFT, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

ELECTRIC-WELDING JIG.

Application filed September 6, 1922. Serial No. 586,410.

*To all whom it may concern:*

Be it known that I, JOSEPH W. MEADOWCROFT, a citizen of the United States, residing at Philadelphia, Pennsylvania, have invented certain new and useful Improvements in Electric-Welding Jigs, of which I declare the following to be a full, clear, and exact description.

My invention relates to improvements in electric welding jigs and has to do, more particularly, with jigs for use in assembling and electrically welding together the parts of automobile bodies and other sheet metal structures.

The chief object of my invention is to provide a durable and efficient jig for use in electrically welding together the parts of sheet metal structures.

Another object of my invention is to provide a jig for electrically welding together the members of sheet metal structures of such a nature that the repair and replacement of parts worn down in the normal operation of the machine is facilitated.

A further object of my invention is to provide an electric welding jig having adjustable welding plugs or contacts which may be individually adjusted to the proper working position as they are worn down or displaced in the operation of the machine.

Further objects, and objects relating to details and economies of construction and operation will definitely appear from the detailed description to follow. In one instance, I accomplish the objects of my invention by the devices and means described in the following specification. My invention is clearly defined and pointed out in the appended claims. A structure constituting a preferred embodiment of my invention is illustrated in the accompanying drawings, forming a part of this specification, in which:

Fig. 1 is a view in side elevation of an electric welding jig embodying my invention.

Fig. 2 is a view of the jig in front elevation.

Fig. 3 is a detail, sectional view, taken on line 3—3 of Fig. 2, the connection of certain parts in the welding circuit being illustrated diagrammatically.

Fig. 4 is a transverse, sectional view through the welding jig, taken on the line 4—4 of Fig. 1, and Fig. 5 is a sectional view, taken on the line 5—5 of Fig. 2.

In the drawings, the same reference numerals refer to the same parts throughout the several views and the sectional views are taken looking in the direction of the arrows at the ends of the section lines.

In an electric welding jig, such as is disclosed in U. S. Letters Patent No. 1,216,466, Joseph Ledwinka, assembling machine, February 20, 1917, portions of the frame, which receives and supports in assembled position the members or pieces to be welded together, are constituted by copper conducting bars connected to one side of the transformer secondary and constituting one of the electrodes connected in the welding circuit. The pieces to be united rest directly on these copper conducting bars throughout their extent. In the use of these machines, it has been found that these conductor bars are apt to be worn down rather rapidly due to the heat generated by the many welding operations to which they are subjected. As a result, the surfaces of these bars become, in time, pitted and uneven and it is necessary to replace them. This replacement requires the entire removal of the bar and the substitution of a new bar therefor. The bars removed are useless for any purpose except remelting to reclaim the copper in them. This renders the repair or replacement of such parts of the welding jigs a comparatively expensive matter, not only because of the length of time during which it is necessary to withdraw the welding jig from duty, but also because of the necessity of replacing the entire conductor bar, even though it may only be worn at particular spots thereon. The purpose of my invention is to provide an electric welding jig which will not be subject to these difficulties and in which the replacement or adjustment of those portions of the conductor members, at which the welding operations take place, may be easily and quickly effected. It is among the special purposes of my invention to eliminate the conductor bars forming a part of the supporting frame and to provide welding plugs or contacts in the frame at the points where the welds are to be made, which welding plugs or contacts may be individually adjusted with reference to the frame, as they are worn down, very quickly and easily, without withdrawing the jig from duty. Another feature of my invention is that any one of these welding plugs or contacts may be replaced by a new one without disturbing or removing the other plugs or contacts of the machine. I propose to provide a framework which receives and supports in assembled position the sheet metal members to be united by electric welding and, at appropriate points in such framework, I propose to insert welding plugs, the outer ends of which normally are flush with and form a part of the supporting surface of the framework, so that the pieces to be united contact with such ends of the welding plug. I propose to make these welding plugs of copper, or any other suitable material, preferably, one which has a higher electrical conductivity than the framework. These several welding plugs are connected to one side of the secondary of the welding transformer and I propose to accomplish this by adjustably connecting the inner ends of these plugs to conductor bars which, in turn, are connected to one side of the secondary of the welding transformer. The adjustable connection of these welding plugs with the conductor bars enables me to adjust the welding plugs as they become worn so as to bring the outer end once more into alignment with the supporting surface of the framework, and it also permits me to remove any one of these welding plugs without removing or disturbing the other plugs or the conductor bars. The electrical welding of the parts to be united is accomplished by the cooperation of a movable electrode, connected to the opposite side of the secondary welding transformer, with these welding plugs.

In the accompanying drawing, I have illustrated an electrical welding jig which constitutes one embodiment of my invention and which is now in use for welding together sheet metal panels to form an automobile tonneau. This jig comprises a framework, 10, which receives and supports the sheet metal members to be united, said framework having various supporting surfaces, such as 11, 12, and 13, which are shaped to the contour of the pieces to be united and with which said pieces contact, as shown in Fig. 3, for instance. In this particular welding jig, the surfaces, 11, are shaped to receive and support the rear panel, A, and side panel, B, of an automobile body tonneau, the edges of which panels are lapped as shown in Fig. 3. The surface, 12, is shaped to support the flange at the edge of the wheel housing formed in the side panel, B, and the surface, 13, is shaped to contact with portions of the rear panel, A, and the wheel housing portion of side panel, B, which overlap and are to be united at this point. At such places in the supporting surfaces of the framework as it is desired to weld the sheet metal members together, the holes or openings, 14, are provided, in which the copper welding plugs, 15, are inserted. The outer ends of these welding plugs are, preferably, in line with the supporting surface in which they are inserted, so that such outer ends form substantially a part of the supporting surface. The inner ends of the several welding plugs, 15, are electrically connected to the secondary of the transformer by the conductor bars, 16, positioned at the inner side of the framework and into which the threaded inner ends, 17, of the welding plugs, 15, are screwed. This screw-thread connection between the welding plug, 15, and the conductor bar, 16, permits the adjustment of the welding plug with reference to the conductor bar, so as to vary the position of the outer end of the plug with reference to the supporting framework in which it is inserted. The welding plug, 15, is locked in adjusted position by the nut, 18, screwed on the threaded end, 17, thereof and engaging the conductor bar, 16. The several conductor bars, 16, are connected by the leads, 20, with one side of the secondary of the welding transformer, 19. The cable, 22, of a movable electrode, 21, is connected to the opposite side of said secondary. The conductor bars, 16, are secured to the inner framework, 10, by means of the bolts, 23, as shown in Fig. 5. Various clamping devices, 24, are provided for clamping the sheet metal members to be united in assembled position on the framework, so that they will be held in such assembled position until they are electrically welded together.

The operation of this electric welding jig is apparent from the foregoing description. When the members to be united are clamped on the framework, the inner surface of one of said members contacts with the outer ends of the welding plugs, 15, as shown in Fig. 3. When the electrode, 21, is brought in contact with the other of the said members, as shown in Fig. 3, the welding circuit is completed between the plug, 15, and the electrode, 21, through the pieces to be united, and such pieces are welded together by the heat generated by the passage of the welding current and the pressure applied by the operator through the movable electrode, 21. When the welding jig is in use, many welding operations are repeatedly performed at each of the welding plugs, 15, and these welding operations tend to wear away the outer end of the plug, so that after the lapse of some time it would lie below the surrounding supporting surface. When this takes place, the lock nut, 18, may be released and the plug, 15, turned so that, due to its screw-thread connection with the conductor bar, 16, the plug will be advanced to bring its outer end into alignment with the supporting surface. If necessary, the outer end of the plug may be dressed off to present a smooth surface free from imperfection and then adjusted to the desired level with respect to the supporting surface. It will be noted that the entire welding plug may be removed by unscrewing the nut, 18, and unscrewing the plug from the conductor bar, 16. This may be done without removing or disturbing the conductor bar or any of the other welding plugs. It is obvious that this renewal of welding plugs may be made whenever the welding plug has worn down so far that further adjustment is impossible due to the length of the thread.

It will be evident that this construction makes it very simple and easy to adjust and remove the several welding plugs so that they may be kept in perfect condition for welding. This electrical welding jig is therefore very effective inasmuch as it is a simple matter to keep it in such condition that the very best welds may be made on it. My invention consists, essentially, in the employment of a plurality of welding plugs carried by or inserted in the supporting frame of the jig and electrically connected in the welding circuit. These plugs may be connected in the welding circuit in any desired manner but the particular construction illustrated, in which the plugs are screwed into the conducting bar, is particularly desirable because of the convenience with which the plugs may be renewed or replaced or adjusted. My invention is, of course, independent of the particular shape of the supporting framework or surfaces and although I have shown it embodied in a jig for welding together sheet metal panels to make an automobile tonneau, it may also be embodied in jigs for uniting by electric welding other parts of an automobile body, or, in fact, in jigs for electrically welding together the parts of any sheet metal structure whatsoever.

I am aware that the particular welding jig illustrated in the accompanying drawing may be changed considerably without departing from the spirit of my invention and, therefore, I claim my invention broadly, as indicated by the appended claims.

Having thus described my invention, what I claim as new and useful and desire to secure by Letters Patent is:

1. An electric welding jig comprising a frame supporting in assembled position the members to be welded together, welding plugs carried by said frame at the points at which it is desired to make electric welds in the said members, a movable electrode, and means connecting said welding plugs and electrode in a welding circuit.

2. An electric welding jig comprising a frame supporting in assembled position the members to be welded together, spaced welding plugs carried by said frame, a transformer, means connecting said plugs to one side of the secondary of said transformer, a movable electrode, and means connecting said electrode to the opposite side of the transformer secondary.

3. An electric welding jig comprising a frame supporting in assembled position the members to be welded together, a plurality of spaced welding plugs carried by said frame, said plugs having a higher electrical conductivity than the frame, a movable electrode, and means for connecting said welding plugs and electrode in a welding circuit.

4. An electric welding jig comprising a frame supporting in assembled position the members to be welded together, a plurality of spaced, copper welding plugs carried by said frame, a movable electrode, and means connecting said welding plugs and electrode in a welding circuit.

5. An electric welding jig comprising a frame receiving and supporting in assembled position the members to be welded together, a plurality of welding plugs inserted in said frame with their ends forming a part of the supporting surface of said frame, a movable electrode, and means for connecting said plugs and electrode in a welding circuit.

6. An electric welding jig comprising a frame for receiving and supporting in assembled position the members to be welded together, a plurality of welding plugs inserted in said frame with their outer ends positioned to form a part of the supporting surface of said frame, said plugs having a higher electrical conductivity than the frame, a movable electrode, and means for connecting said plugs and electrode in a welding circuit.

7. In an electric welding jig, a jig frame member having a plurality of spaced welding plugs of relatively high electrical conductivity inserted therein.

8. An electric welding jig comprising a frame receiving and supporting in assembled position the members to be welded together, means for clamping said members against one or more surfaces of said frame, a conductor bar connected in a welding circuit and positioned adjacent the inner surface of said frame, and welding plugs electrically connected with said conductor bar and projecting through the frame, the ends of said plugs being exposed at the outer surface of the frame so that the members to be united will contact therewith.

9. An electric welding jig comprising a frame receiving and supporting in assembled position the members to be welded together, a plurality of welding plugs inserted in said frame and adjustable with reference thereto, the ends of said plugs being exposed at the outer surface of the frame so that said members may contact therewith, a movable electrode, and means for connecting said welding plugs and electrode in a welding circuit.

10. An electric welding jig comprising a frame receiving and supporting in assembled position the members to be welded together, means for clamping said members against one or more surfaces of said frame, a conductor bar connected in a welding circuit and positioned adjacent the inner surface of said frame, welding plugs screwed into said conductor bar and projecting through the frame, the ends of said plugs being exposed at the outer surface of the frame so that the members to be united may contact therewith, and a movable electrode connected in the welding circuit and cooperating with said welding plugs.

11. An electric welding jig comprising a frame receiving and supporting in assembled position the members to be welded together, means for clamping said members against one or more surfaces of said frame, a conductor bar connected in a welding circuit and positioned adjacent the inner surface of said frame, welding plugs screwed into said conductor bar and projecting through the frame, the ends of said plugs being exposed at the outer surface of the frame so that the members to be united may contact therewith, nuts screwed on the inner threaded ends of said plugs and engaging the conductor bar, and a movable electrode connected in the welding circuit and cooperating with said welding plug.

12. An electric welding jig comprising a frame receiving and supporting in assembled position the members to be welded together and having a plurality of openings, welding plugs of relatively high electrical conductivity positioned in said openings, means for electrically connecting the inner ends of said plugs in a welding circuit, and a movable electrode connected in the welding circuit and adapted to be brought into contact with the members to be united at any one of said plugs, whereby the welding current will pass between the plug and electrode through the pieces to be united.

13. An electric welding jig comprising a frame receiving and supporting the members to be welded together in assembled position and having a plurality of openings therein, welding plugs of relatively high electrical conductivity positioned in said openings, a transformer, a conductor bar connecting the inner ends of said plugs with one side of the secondary of said transformer, and a movable electrode connected to the opposite side of said secondary and adapted to be brought into contact with the members to be united at any one of said plugs, whereby the welding current will pass between the plug and electrode through the parts to be united.

14. An electric welding jig comprising a frame receiving and supporting in assembled position the members to be welded together, clamping devices engaging said members to clamp the same in assembled position, said frame having a plurality of openings therein, welding plugs of relatively high electrical conductivity inserted in said openings, a transformer, means electrically connecting the inner ends of said plugs to one side of the transformer secondary, and a movable electrode connected to the opposite side of said secondary and adapted to be brought into contact with the members to be united at any one of said plugs, whereby the welding current will pass between the plug and electrode, through the members to be united.

15. An electric welding jig comprising a frame receiving and supporting in assembled position the members to be welded together, metal pieces of higher electrical conductivity than the frame inserted therein, a movable electrode, and means for connecting said pieces and electrode in a welding circuit.

16. In an electric welding jig, a supporting frame member for the parts to be welded, in combination with a plurality of welding plugs carried by said frame member and individually adjustable therein, a cooperating movable electrode, and means to connect said plugs and electrode in a welding circuit.

17. In an electric welding jig, a frame member having a work supporting surface, a welding plug adjustably mounted in said frame member and extending therethrough to be flush with said work supporting surface, a cooperating movable electrode, and means to connect said plug and electrode in a welding circuit.

18. In an electric welding jig, a frame member having a work supporting surface, a plurality of individual adjustable welding plugs mounted in said frame member to extend therethrough to the work supporting surface thereof, a cooperating movable electrode and means to connect said plugs and electrode in a welding circuit.

19. In an electric welding jig, a frame member having a work supporting surface, one or more independently removable welding plugs extending through said member to said surface, a cooperating movable electrode and means to connect said electrode and plugs in a welding circuit.

20. In an electric welding jig, a frame member having a work supporting surface, one or more independently adjustable welding plugs extending through said member to said surface, a cooperating movable electrode, and means to connect said electrode and plugs in a welding circuit.

21. An electric welding jig including a frame member having a work supporting surface and welding plugs carried by said frame member and normally lying flush with said surface at the points where welds are to be made, said plugs being individually adjustable, and a cooperating movable electrode.

22. An electric welding jig for spot-welding comprising a frame adapted to support in assembled position the members to be spot welded together, and a plurality of spaced welding plugs carried by said frame, which plugs are of relatively high electrical conductivity and define by their projecting ends the locations of the welding spots.

23. An electrode fixture for spot welding jigs comprising an elongated conductor bar and a plurality of welding plugs adapted to make welding contact with their ends, carried by said bar and adjustable vertically with respect to the face thereof.

In testimony whereof I affix my signature.

JOSEPH W. MEADOWCROFT.